No. 608,389. Patented Aug. 2, 1898.
C. L. DAVIES.
RAPID TELEGRAPHIC TRANSMISSION ON CABLE LINES.
(Application filed June 25, 1896.)

(No Model.) 2 Sheets—Sheet 1.

Witnesses.
B. W. Miller
E. N. Pollock

Inventor.
Charles Langdon Davies,
By his Attorneys
Baldwin, Davidson & Wight

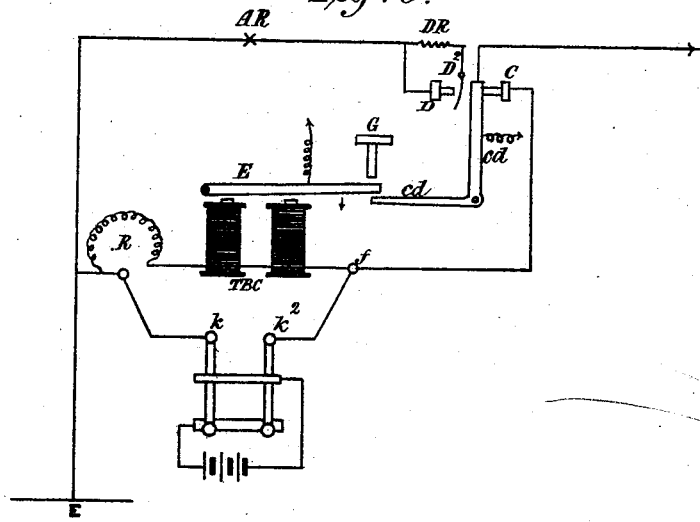
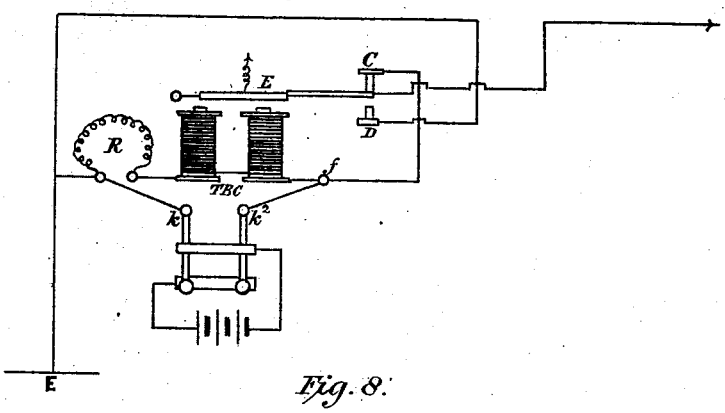
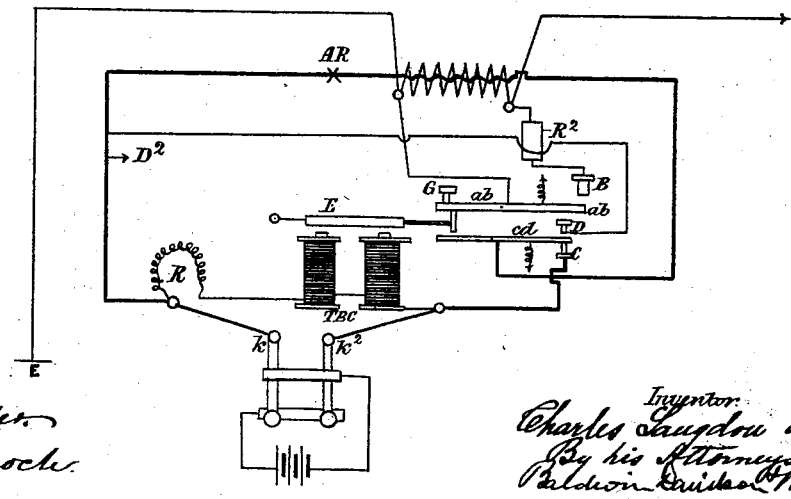

UNITED STATES PATENT OFFICE.

CHARLES LANGDON DAVIES, OF LONDON, ENGLAND.

RAPID TELEGRAPHIC TRANSMISSION ON CABLE-LINES.

SPECIFICATION forming part of Letters Patent No. 608,389, dated August 2, 1898.

Application filed June 25, 1896. Serial No. 596,927. (No model.)

*To all whom it may concern:*

Be it known that I, CHARLES LANGDON DAVIES, electrician, a subject of the Queen of Great Britain, residing at No. 45 Redcliffe Square, Kensington, London, in the county of Middlesex, England, have invented the Anapede System of Rapid Telegraphic Transmission on Cable-Lines, of which the following is a specification.

The object of my invention is to increase the speed of transmission on submarine telegraph-cables or on other telegraph-circuits of similar electrical characteristics.

Electric currents when passing upon submarine cables or similar conductors become elongated and if they are sent in rapid succession overlap each other. This limits the speed at which separate signals can be transmitted on such conductors.

Hitherto it has been proposed in sending telegraph-signals over cable-circuits to employ local relays and switches to send impulses of regular period from the seat of electromotive force and to automatically disconnect the line from the battery and ground the line after each impulse.

My invention consists, first, in causing the rapid charging of the cable by means of a source of high electromotive force, which electromotive force is automatically cut off from the cable conductor by a specially-constructed time-break electromagnet when the current in the cable has reached a certain desired strength, thus preventing the current from rising beyond this point; second, in providing means whereby the charged cable conductor is insulated at the transmitting end for a certain desired interval and is then automatically connected to the discharging circuit, and, third, in providing means whereby the cable conductor may be rapidly discharged.

My invention is applicable both when the current sent to cable is applied directly from a source of electromotive force, as a battery or current-generator, and also when supplied through the medium of an induction-coil in the primary of which the source of electromotive force is placed.

Figure 1:
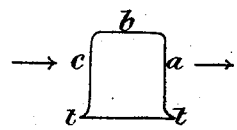
Figure 2:
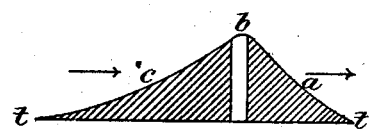
Figure 3:
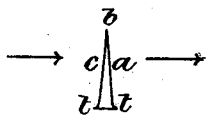
Figure 4:
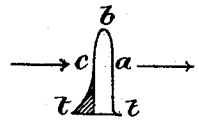
Figure 5:
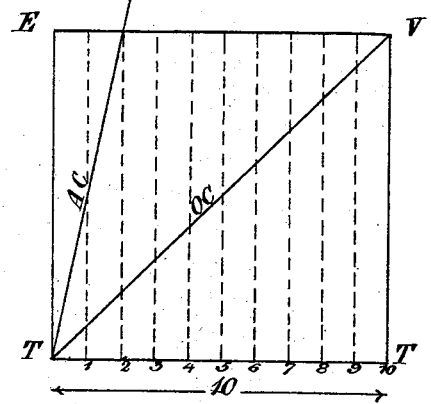

Figure 1 represents the form of current impulse sent from a source of constant electromotive force when the line-circuit is short and contains no cable. Fig. 2 represents the same when the line-circuit consists of a cable of some considerable length. Fig. 3 represents the form of current impulse sent by means of my invention over a short line-circuit. Fig. 4 represents the same over a circuit containing a considerable length of cable. Fig. 5 represents in diagram the comparative time required to reach a certain strength of current with a high and with a lower electromotive force. Figs. 6, 7, and 8 represent in diagram the time-break electromagnet and circuit connections which I employ to accomplish my invention.

Referring now to Fig. 1, it is well known that a current impulse sent over a short line practically devoid of capacity and inductance will follow closely the motion of the sending-key, rising rapidly to its maximum value as the key closes and maintaining this maximum until the key is again opened, when it falls abruptly again to zero.

In Fig. 1, $a$ represents the rise; $b$, the duration of the maximum; $c$, the duration of the fall, and $t\,t$ the duration of the whole operation in the direction of the arrow-heads. When now the impulse is sent upon a long cable-line, the current rises much more slowly at the receiving end, the duration of the maximum is shortened, and the fall prolonged, so that only a small portion of the total time required for the complete impulse is effective in operating the receiving instrument. This is illustrated in Fig. 2, where again $a$ represents the rise in current, now retarded; $b$ represents the duration of the maximum, the unshaded portion of the impulse showing the portion of effectiveness upon the receiving instrument; $c$ represents the fall, now prolonged, and $t\,t$, in the direction of the arrow-heads, the duration of the entire impulse, of which the shaded portion has but little effectiveness. In comparison with this Figs. 3 and 4 show the effect of my invention. As derivable from my generators the anapedic current, Fig. 3, rises and falls rapidly and has no appreciable duration at its maximum. As altered by the circuit it rises rapidly at $a$, Fig. 4, charges the line for no longer than is necessary at $b$, and falls rapidly at $c$. The slight prolongation indicated by the shaded portion is capable of further reduction, if required, by means of a curb, of which I hereinafter speak.

Fig. 5 explains the groundwork of my system. T T is the "time-constant" of some given circuit, by which I mean the time in which a current rises to a certain fraction of its maximum value, and is the same for currents of all degrees of strength in that circuit. I mark it as 10. E V is the line of efficiency to which the current must rise to work the circuit, and T V is its strength. The diagonal O C represents, approximately, the rise of an ordinary working current in that circuit under a ten-volt pressure. Now A C represents, approximately, the first part of the rise of a current under a pressure of fifty volts in the same circuit. It reaches the line of efficiency E V in one-fifth of the time required for the ordinary current O C, and as by the means hereinafter described I prevent it from continuing its rise beyond the point required I obtain a result in the circuit approximately like that of a current of ten volts, but in a fifth of the time hitherto required. This speed can be varied by suitable arrangements.

I replace the usual line-battery by a generator consisting, first, of an electromotive source capable of giving, under the conditions referred to with regard to Fig. 1, a stronger current than I intend shall rise in the line, and, secondly, of apparatus which cuts the current off from the line at a predetermined point in its rise while it is still rising and before it has reached its maximum.

The electromotive source is a battery, preferably of low interior resistance and giving a constant current, such as a secondary battery or accumulator, with or without an induction-coil. The apparatus for cutting off the current from the line at an adjustable moment after the key is closed is a time-break whose mechanism is preferably worked by an electromagnet, as described hereinafter, which enables the current to cut itself off automatically. Figs. 6, 7, and 8 represent this apparatus and the manner in which it is employed. The same letters indicate the same things in all three figures.

Fig. 6 shows the arrangements of the time-break and circuits. One of the key-terminals $K^2$ is connected through $f$, the furcating terminal, to the screw C. The moving beam $c\,d$ is connected to the line. The screw D is connected to earth and also to the other key-terminal K. The coils of the electromagnet T B C are connected through an adjustable resistance R to the terminal K and earth and to $K^2$ and $f$. The lever E moves a certain distance before it cuts the current from the line-circuit by touching the line-beam. This distance regulates the time allowed for the current to rise (see $a$, Fig. 4) in the line-circuit, and it is governed by the stop-screw G, against which the lever E is pulled by a counter-spring. The time occupied by the beam $c\,d$ in moving from C to D is adjustable by moving C and D, and it governs the length of the time during which the line remains charged, (see $b$, Fig. 4.) The junction of $c\,d$ with D curbs the current and discharges the line. This action I modify when required in two ways—first, by inserting an adjustable resistance in the wire to earth at, say, A R; second, by placing such a resistance at D R between the screw D and a movable contact-piece $D^2$, whereby the line-beam $c\,d$, touching $D^2$, accelerates the fall of current less at first than when the resistance D R is cut out by the contact of $D^2$ with D.

The resistance R, regulating the current in the time-break coils, may be either inductive or non-inductive, or partly of each. Under some circumstances it can be used to regulate the rise of the current in T B C, as to dispense with the beam $c\,d$. This is shown in Fig. 7, where E, the armature-lever, is connected to the line and acts directly on the screws C and D. The interval allowed for the line-current to rise is provided by introducing magnetic lag into the resistance R, whereby the lever E is held by its counter-spring on C for a period adjustable by adjusting the lag.

Fig. 8 shows the connections when an induction-coil is included in the generator. The organs connected to line and earth in Figs. 6 and 7 are connected in Fig. 8 to the primary circuit. The secondary coil is connected to line and earth, and the beam $a\,b$ and screw B are connected through a resistance, as a shunt, to the secondary. By this method the rise of the line-current is limited in either or both of two ways—first, by cutting off the battery and closing the primary circuit on itself by the screw D and, say, the point $D^2$; second, by closing the shunt to the secondary. The discharge from the secondary is also a convenient curb, expediting the fall of the line-current, and this curb can be regulated by the resistance $R^2$ in the shunt.

The method of action of the organization of Fig. 8 may be described, stage by stage, as follows: When the apparatus is at rest, (which may be called "stage 0,") the parts are in the position shown by the drawings, and the battery is not applied, because neither of the finger-keys is depressed, and of course no current flows. Stage 1: One or other of the finger-keys $k\,k^2$ is depressed, and then the current flows in the primary circuit by the path $k$ $D^2$ A R $c\,d$ C $k^2$ and battery. It also flows through the electromagnet-coils T B C and the resistance R. The result is the generation of a current in the secondary which flows to line and is the signal-current. Stage 2: The electromagnet T B C has had time to respond and attract its armature E. It so acts upon the levers $c\,d$ and separates the contact at C. The result is that a counter-current is induced in the secondary coil and flows into the line. Stage 3: The lever $a\,b$ makes contact with B. The secondary coil is then short-circuited. The short circuit can be traced from the left-hand end of this coil to $a\,b$ B $R^2$, and so to the right-hand end of the coil. The result of closing this short circuit is to arrest the flow of current from the secondary coil to line. In this way the amount of counter-current sent to line is regulated. Stage 4: The lever $c\,d$ makes contact with D, and the primary circuit of the induction-bobbin is short-circuited by the path A R $D^2$ D $c\,d$ induction-bobbin. The result of this short circuit is to facilitate the discharge of the induction-bobbin without influencing the line. Stage 5: The finger-key is allowed to rise, and the parts return to the position shown in Fig. 8 without producing any electrical effect in the line.

The above is one of the ways in which the apparatus may be worked.

The speed of the time-break can be proportioned to the strength of the battery and regulated to apply a given current to the line from batteries of different strengths, whereby increasing the battery will increase the speed of rise of the line-current, but not the maximum value of the current on the line. The key may be a hand or machine sender of suitable form, with the battery connected to it in the usual way.

I claim as my invention—

1. The combination with a telegraph-line including in its circuit the secondary winding of an induction-coil, the primary winding of which is included in circuit with a transmitting-key and source of electromotive force, of an electromagnetic time-break containing in its circuit an adjustable resistance or retardation adapted to control the time of vitalization of the armature of the magnet, a shunt to the secondary winding and its contacts controlled by said armature, whereby the key-circuit may be automatically opened independent of the opening of the transmitting-key, and the secondary winding of the induction-coil may be shunted, substantially as and for the purpose specified.

2. The combination with a telegraph-line including in its circuit the secondary winding of an induction-coil, the primary winding of which is included in circuit with a transmitting-key and source of electromotive force, of an electromagnetic time-break containing in its circuit an adjustable resistance or retardation adapted to control the time of vitalization of the armature of the magnet, a shunt to the secondary winding and a shunt to the primary winding both having contacts that may be controlled by said armature, whereby the key-circuit may be automatically opened independent of the opening of the transmitting-key, and one or both of the coils of the induction-coil may be shunted, substantially as and for the purpose specified.

3. The combination with a key, a source of electromotive force and a line, of a circuit connection containing normally-closed separable contacts through which the line is connected with the source of electromotive force on the closing of the key, and a time-break electromagnet, controlling the separable contacts, whose vitalization is controlled by the closing of the key and on the vitalization of which the normally-closed contacts are separated to disconnect the line from the source of electromotive force upon the lapse of a predetermined interval after the source of electromotive force is connected to the line.

4. The combination with a key, a source of electromotive force and a line, of a circuit connection containing normally-closed separable contacts through which the line is connected with the source of electromotive force on the closing of the key, a time-break electromagnet, controlling the separable contacts, whose vitalization is controlled by the closing of the key and on the vitalization of which the normally-closed contacts are separated to disconnect the line from the source of electromotive force upon the lapse of a predetermined interval after the source of electromotive force is connected to the line, and an earth-connected contact to which the line is connected after the separation of said normally-closed contacts.

5. The combination with a key and a source of electromotive force for transmitting telegraphic signals over a line or cable circuit, of an electromagnet actuated following the closing of the key to disconnect the line from the source of electromotive force before the current from said source has risen in the line to its effective maximum.

6. The combination with a key and a source of electromotive force for transmitting telegraphic signals over a line or cable circuit, of an electromagnet actuated following the closing of the key to disconnect the line from the source of electromotive force before the current from said source has risen in the line to its effective maximum, and means for then connecting the line to earth.

7. The combination consisting of a main circuit, a key, and an electromotive source, separable contacts normally closed in the main circuit, a shunt on the main circuit, and a time-break magnet in the shunt and in operative connection with the separable contacts, the whole so arranged that when the key is closed the electric current at once passes in the main circuit as well as in the shunt and continues to do so until the time-break magnet operates to open the separable contacts.

8. The combination consisting of a main circuit, a key, and an electromotive source, separable contacts normally closed in the main circuit, a shunt on the main circuit, and a time-break magnet in the shunt and in operative connection with the separable contacts, and a grounded contact against which one of the separable contacts bears when said contacts are separated, the whole so arranged that when the key is closed the electric current at once passes in the main circuit as well as in the shunt and continues to do so until the time-break magnet operates to open the separable contacts, first to open the line-circuit and then to put the line-circuit to earth.

CHARLES LANGDON DAVIES.

Witnesses:
DEANSTON CARPMAEL,
WILFRED CARPMAEL.